United States Patent [19]
Bolliger

[11] 3,762,183
[45] Oct. 2, 1973

[54] SAFETY DEVICE COUPLING

[75] Inventor: Edwin Bolliger, Morges, Switzerland

[73] Assignee: J. Bobst & Fils, S. A.

[22] Filed: June 30, 1971

[21] Appl. No.: 158,254

[52] U.S. Cl. .................................................... 64/29
[51] Int. Cl. .............................................. F16d 7/00
[58] Field of Search .................................. 64/28, 29

[56] References Cited
UNITED STATES PATENTS
| | | | |
|---|---|---|---|
| 2,501,648 | 3/1950 | Ogden | 64/29 |
| 3,036,447 | 5/1962 | Wilhelmsson et al. | 64/29 |
| 2,930,212 | 3/1960 | Muller et al. | 64/29 |

FOREIGN PATENTS OR APPLICATIONS
| | | | |
|---|---|---|---|
| 785,642 | 5/1935 | France | 64/29 |

*Primary Examiner*—Edward G. Favors
*Attorney*—Carlton Hill

[57] ABSTRACT

Efficiencies of construction, operation and maintenance are provided by an overload release coupling comprising a rotatable housing means having a driven member journalled therein with the driven member having radially extending resiliently biased piston means that engage mating recess areas on an inner surface area of the housing means. Should an excessive load prevent the housing means and an attached sprocket wheel from moving, the piston would overcome the resilient biasing force and be forced out of their recessed seats to prevent injury to persons and apparatus. A microswitch activated by the unseating stops the machine at once. An adjustment means generally radially aligned with the piston means and a resilient means extends into an open central portion of the driven means whereby adjustment of the resilient biasing force against the radially outwardly projecting piston may be readily effected. The housing member includes first and second halves which have a groove at their juncture area which groove receives a wearing member insert that forms the inner recess surface which engages the piston members. The halves and insert as well as a chain wheel may be held together by a connector means to allow ease of assembly and disassembly.

8 Claims, 2 Drawing Figures

United States Patent [19]
Bolliger
[11] 3,762,183
[45] Oct. 2, 1973
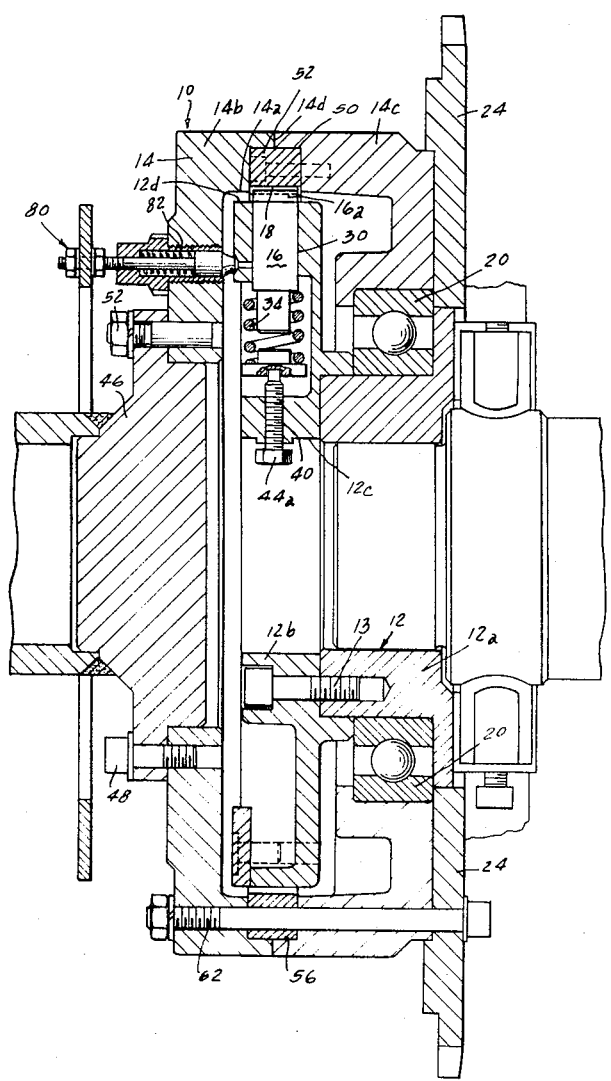

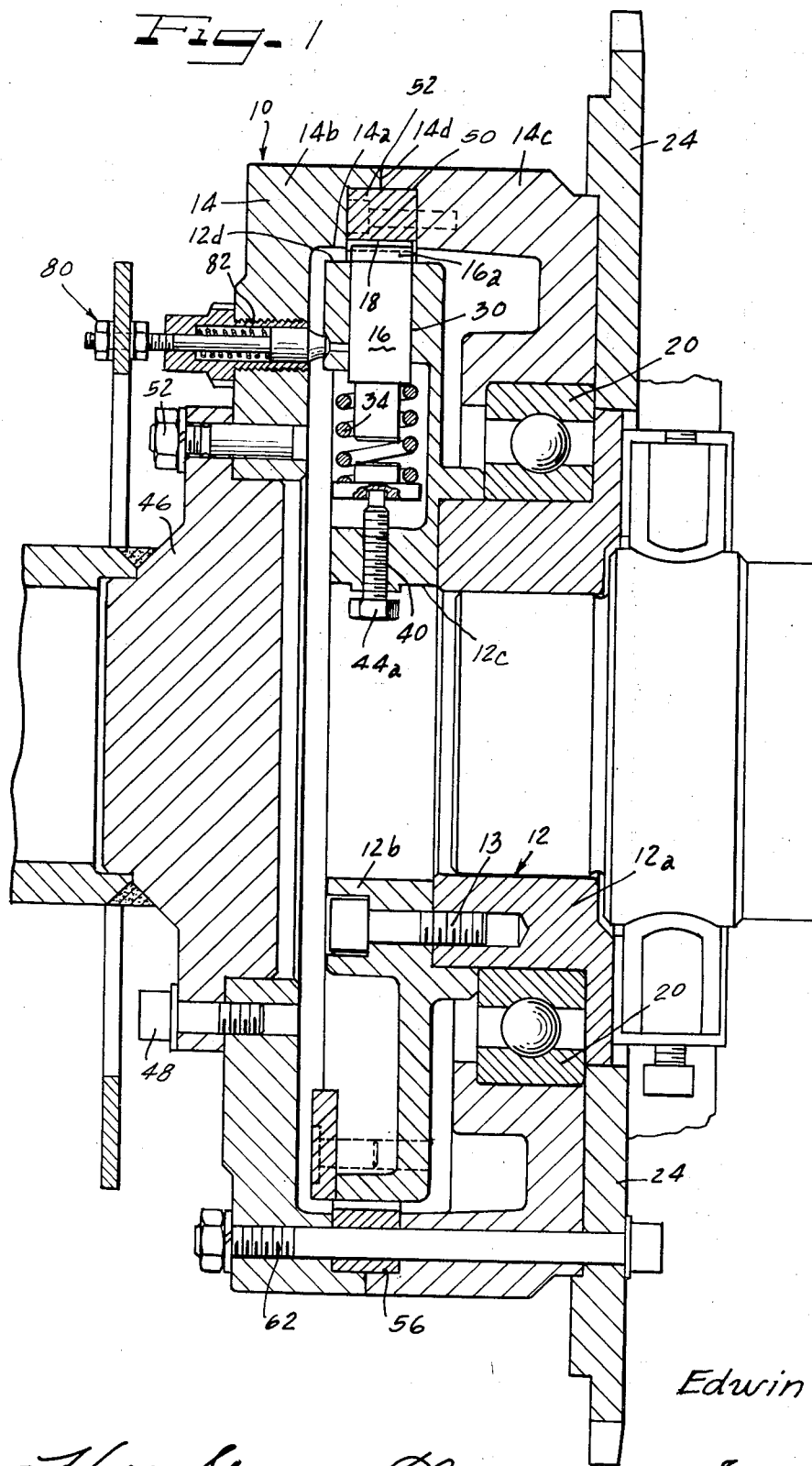

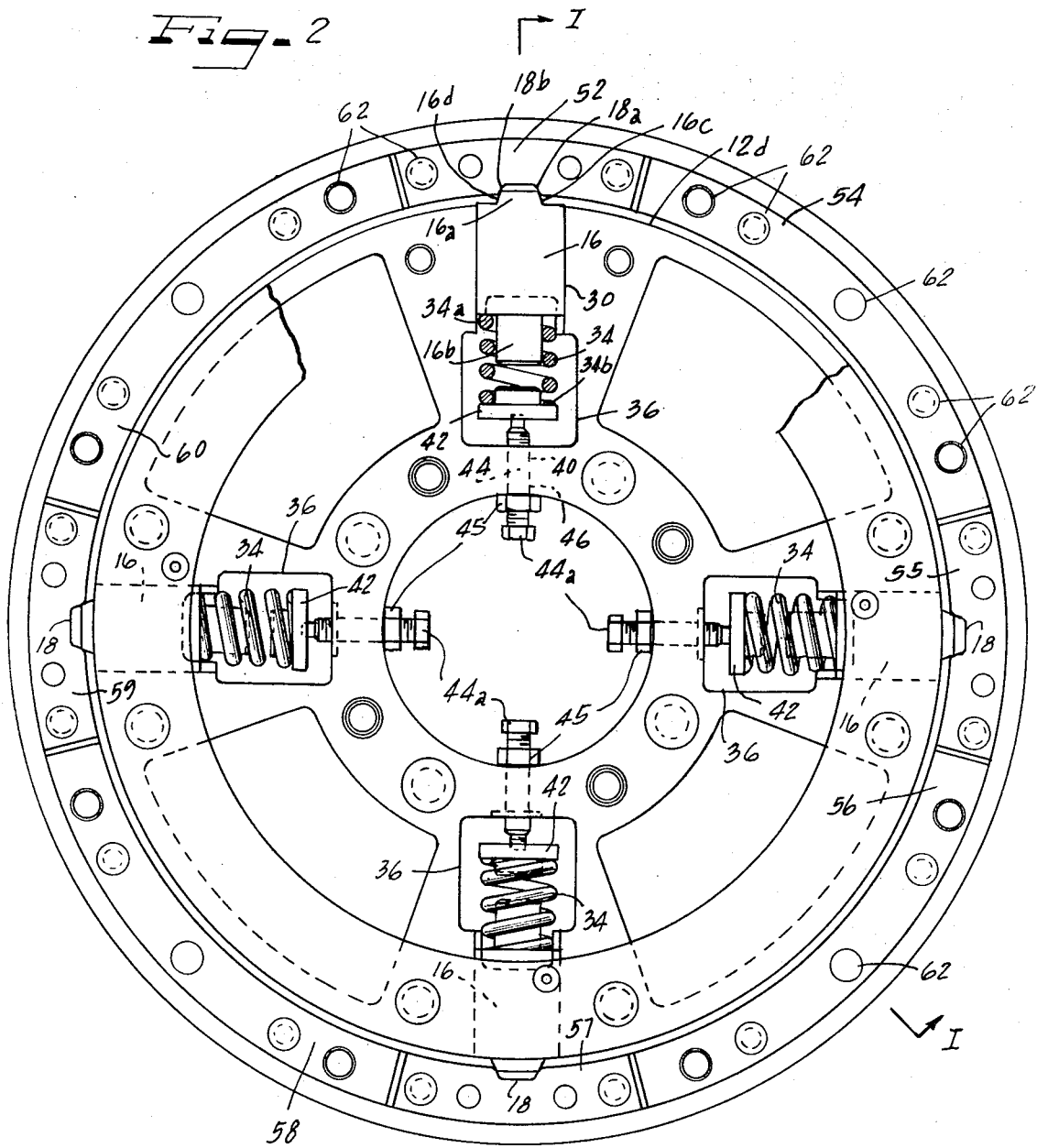

SAFETY DEVICE COUPLING

BACKGROUND OF THE INVENTION

1. Field of the Invention

This invention generally relates to an improved power coupling device and more specifically concerns an efficient overload safety release coupling particularly adapted for use in a sheet feed control means in a platen press.

2. Prior Art

In the processing of sheet material between reciprocating platen presses the sheet material is intermittently moved by suitable chain supported gripper bars between various processing stations. The intermittent movement of the chain is effected by power transmission through a sector gear so that the chain will move an exact distance, stop for an exact predetermined time and repeat this cycle many thousands of times per hour over long periods of time. In the event of a malfunction of the sheet material or other problems causing an overload to the sheet feed system it is important that the intermittent power be interrupted until the machine may be stopped and the overload condition corrected. Because of the high speed and extended operation of the platen press aparatus it is important that a safety overload release coupling be provided between the power source and the sheet feed system drive which is relieable, adjustable, and efficient in construction, operation and maintenance. With respect to the latter maintenance requirement, it will be understood that in the printing and paper board coverting industry time is usually of the essence and that maximum use of the machine dictates that "down-time" be reduced to a minimum.

It is known in the prior art, U.S. Pat. No. 3,063,263, to provide an overload release coupling between the power source and a sheet feed mechanism in a platen press. It has been found, however, that new conditions of operation including much higher speeds, greater torque and the increasing emphasis on design efficiency require an improved design.

SUMMARY OF THE INVENTION

The improved safety release coupling design which meets a wide range of conditions of operations and which provides efficiency in construction, operation and maintenance comprises a power couple wherein a driven member has radially extending piston means which are resiliently biased outwardly so that their heads engage in mating seats on an apparatus driving housing member. Thus, the housing member includes a generally cylindrical inner surface area which includes the recesses into which the heads of the piston means are held by the resilient biasing means. In this manner, a power connection of the housing member with the driven member is effected so that power may be transmitted therebetween under normal conditions but in which an overload on an apparatus connected with the housing member will cause the piston members to disengage from the recess and at the same time signal the disengagement so that the power is immediately interrupted to allow correcton of the overload condition.

Although it is contemplated that any number of co-operating piston, recess means may be provided, four are set forth in the illustrated embodiment. Each piston means is slidably received in a cylinder means in the driving member and has a first or outer end portion projecting beyond the periphery of the driven member and a second or inner end portion engaging a resilient biasing means. The resilient biasing means may be housed in a suitable means in the driven member. An adjustment means is provided for the resilient biasing means to vary the compression on the resilient biasing means and thereby adjust the outward force of the piston member and its consequent unseating force. By this means the magnitude of the overload which must occur before the coupling disengages may be varied and accurately controlled. In one form of adjustment means the driven member may have a hollow inner central portion into which the head of a threaded adjustment screw may project or be accessible from, so that adjustment of the spring force may be readily and conveniently effected. The resilient means itself may have a first end engaging the second or inner portion of the piston and a second end engaging the adjustment means.

The driven member is journalled in the housing and has at least circumferential portions thereof lying on a circular outer periphery that is of a slightly lesser diameter than an inner surface of the housing member. The piston means preferably are situated in these circumferential portions so that the piston head will be biased against the inner surface area of the housing member and seat in the recesses therein. I have found a rectangular tapered piston head configuration provides excellent results when it is received in a mating recess. In this case the head and recess may have parallel surfaces whereby when the head is seated in the recess planar contact is effected therebetween.

It is another feature of the invention that the elements are quickly and conveniently assembled and disassembled. Thus, the housing member may comprise first and second half portions having a circumferential juncture area. As shown this juncture area may pass through the inner surface area and extend about the inner periphery of the housing means. A continuous or intermittent groove in the inner surface and juncture areas may be provided to receive segmented wearing members or inserts which wearing members serve to form the inner surface area of the housing means and include the recess into which the piston head is seated. By this means the worn piston and recessed wearing member may be easily replaced. A common bolt means may secure the housing halves as well as the wearing member in a unitary relationship. Where the housing means is attached to a chain wheel the bolt may continue through that wheel also to provide a unity of function and simplify the construction and maintenance of the apparatus.

From the foregoing summary of the invention it may be understood that the safety overload release coupling of the invention provides efficiencies of construction, operation and maintenance which allow it to meet varied conditions of operation and distinguish it over the prior art.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a longitudinal cross sectional view of a safety overload release coupling in place on a platen press sheet feed drive mechanism taken along the line 1—1 of FIG. 2;

FIG. 2 is a cross sectional end elevational view of the apparatus of FIG. 1 showing an exemplary view of the piston head and its engagement in a recess in the segmented wearing member.

DESCRIPTION OF A PREFERRED EMBODIMENT

An overload release coupling according to the invention is generally indicated at 10 in FIG. 1 and may be seen to comprise basically a driven member 12 journalled in a rotatable housing 14 with the only means of driving contact therebetween being provided by one or more piston means 16 resiliently engaging a recess means 18 in the housing means 14.

The driven member 12 is journalled in the housing member 14 by suitable bearing means such as the ball bearings 20. A first portion 12a of the driven member 12 is connected by suitable means to a power source which drives the driven member 12. In the particular environment shown intermittent driving force is provided through a sector gear, not shown, so that the housing member 14 and an attached chain wheel 24 may drive a chain driven sheet feed mechanism for a platen press.

A second portion 12b of the driven member 12 is connected to the first portion 12a by suitalbe means 13 and includes a radially extending cylinder means 30 at spaced points about its periphery. The piston means 16 are slidably received in the cylinder means 30 and have a first or head portion 16a resiliently biased into engagement with the recess 18. A resilient biasing means 34 has a first portion 34a engaging a second end 16b of the piston means 16 and a second end 34b engaging an adjustment means generally indicated at 40.

The resilient means 34 may be suitably received in the cylinder means 30 or enlarged portion 36 thereof. Where the resilient means 34 may include a coil spring as shown, the adjustment means 40 for varying the outward biasing force of the resilient means 34 against the piston 16 may include a resilient means contacting portion 42 and a screw threaded adjustment member 44 threadedly secured in a hole 46 in the driven member 12. An inner central hollow portion 12c in the driven member 12 allows the head 44a of the screw 44 to extend into the hollow portion 12c and thus be readily accessible for change of adjustment. A locking nut 45 may be provided to securely lock the adjustment bolt 44 against movement. As the coil spring 34 is compressed by the adjustment means 40 a greater force will be imparted to the piston member 16 urging it into tighter seating engagement with the recess 18 in the housing member 14.

While the details of the piston, resilient means and adjustment means have been shown with respect to only one example, it will be understood by those skilled in the art that this construction may be situated and duplicated at points spaced about an outer periphery 12d of the driven member 12, such as for example, the four quarter points of the disc-like member 12b. It will also be understood that only the portions of the periphery 12d which include the piston means 16 need be spaced adjacent an inner surface area 14a of the housing 14.

As may be seen in FIG. 1 the housing member 14 has a shaft means 46 connected thereto by suitable means 48. The housing means 14 have an inner surface area 14a radially spaced from the outer periphery 12d of the driven member 12. The housing member 14 may include a groove 50 in the area of the inner surface 14a which receives an insert member 52 having the recess 18 therein. As may be best seen in FIG. 2 the insert or wearing member 52 may be segmented to include a plurality of additional segments 54 through 60 which abut each other to form a complete circle with the member 52. It will be further seen from FIG. 2 that only segments 52, 55, 57 and 59 need be replaced because of wear of the recesses 18 thereby further simplifying and reducing maintenance time and expense. It is also within the contemplation of this invention that the groove 50 might be intermittent so that it would only contain replaceable segments such as 52, 55, 57 and 59.

The housing member 14 may further comprise first and second halves 14b, 14c, respectively, which halves have a juncture area 14d in the area of the inner surface 14a. This juncture area 14d extends about the periphery of the housing 14 and I have found it advantageous to have it occur in the area of the groove 50. With this construction removal of the segmented portions such as 52 from the groove 50 is greatly facilitated. Moreover, the insert 52 provides a seal function for the juncture 14d. The halves 14b and 14c may be held together by a plurality of bolt means such as shown at 62 which may be spaced about the periphery of the housing member 14 as required. I have found it advantageous for the bolt means 62 to extend through the insert to thereby secure the insert to the housing member 14 whereby a unitary structure is provided. In addition, where the safety release coupling 10 of the invention is placed in abutment with an apparatus such as the chain drive wheel 24 over which the chain of a sheet feed supply means is wound, I have found it convenient to extend the bolt means 62 through this wheel means so that the housing 14 and the wheel means 24 will rotate together and the power transmitted through the driven member 12 to the housing member 14 will be positively transferred to the sheet movement means through the chain wheel 24.

The housing member 14 may additionally have attached and connected therewith a microswitch means 80 of known construction which extends through an opening 82 in the housing member 14 and engages the driven member 12 whereby if an excessive load on the housing or chain wheel 24 causes the driven member 12 to force the piston head 16a out of the recess 18 the microswitch 80 will be moved laterally and thereby signal a control which will stop the apparatus to prevent injury or damage.

With the only contact between the driven member 12 and the housing or accessory driving member 14 being the seating of the piston head 16a in the recess 18, it is important that the area of contact between the head 16a and the recess 18 be accurate and consistent. These qualities, I have found, are provided by a rectangular tapered piston head configuration which may be seen by a review of both FIGS. 1 and 2. In this case the head 16a has surfaces 16c, 16d, which are parallel to and abut surfaces 18a and 18b, respectively, of the recess 18. The planar contact thus provided between teh head 16a and the recess 18 is efficient and operates consistently.

From the foregoing description of my invention it may be seen that I have provided an overload release coupling which is efficient, reliable and easy to maintain. By this means power is transmitted from a driven member 12 to the housing member 14 and its attached chain wheel 24 by contact between the resiliently outwardly biased piston head 16a and the recess 18. The pressure between these two members is such that a force in the driving member 12 which exceeds a predetermined amount will cause the piston 16 to be moved inwardly and thus disengage from the recess 18 while at the same time disengaging a microswitch 80 to shut down the operation of the apparatus. By means of the adjustment means 40 the pressure on a resilient biasing means 34 may be varied to thereby vary the difference in force which will cause disengagement of the driven member 12 from the housing member 14. The ease of disassembly of the device 10 and the replaceability of the wearing parts such as the piston 16 and a recessed segment 52 minimizes maintenance "down-time" and provides a low cost structure.

Although minor modifications might be suggested by those versed in the art, it should be understood that I wish to embody within the scope of the patent warrented hereon all such modifications as reasonably and properly come within the scope of my contribution to the art.

I claim:
1. An overlaod release coupling comprising a rotatable housing means, a driven member journalled in said housing means, said driven member having at least portions thereof lying on a generally circular outer periphery, said driven member having radially extending cylinder means with a piston means therein, said housing means having an inner surface area radially spaced from said driven member outer periphery, a recess means in said inner surface of said housing means, said piston having a first portion and a second portion, and a resilient means on said driven member bearing against said second portion to bias said piston outwardly of said outer periphery of said driven member, said piston first portion engaging said recess in said inner surface area whereby said driven member and said housing means are caused to rotate together under normal conditions but are disengaged when the forces between the driven member and the housing member overcome the biasing force of said resilient means, said driven member including adjustment means to vary the outward biasing force of said resilient means which urges said piston into said recess, said driven member having a hollow central portion, said resilient means having a first end engaging said second portion of said piston and a second end engaging said adjustment means, said adjustment means comprising a radially extending screw means having a portion thereof accessible from the hollow area of said driven member.

2. An overload release coupling comprising a rotatable housing means, a driven member journalled in said housing means, said driven member having at least portions thereof lying on a generally circular outer periphery, said driven member having radially extending cylinder means with a piston means therein, said housing means having an inner surface area radially spaced from said driven member outer periphery, a recess means in said inner surface of said housing means, said piston having a first portion and a second portion, and a resilient means on said driven member bearing against said second portion to bias said piston outwardly of said outer periphery of said driven member, said piston first portion engaging said recess in said inner surface area whereby said driven member and said housing means are caused to rotate together under normal conditions but are disengaged when the forces between the driven member and the housing member overcome the biasing force of said resilient means, said housing means comprising first and second halves, said halves having a juncture area, said juncture area being adjacent said inner surface area, said juncture area extending about the inner periphery of said housing means, said juncture area having a groove therein, said groove receiving segmented wearing members, said wearing members forming said inner surface area of said housing means and having said recess therein.

3. An overload release coupling according to claim 2 wherein said first and second housing means and said wearing members are secured together by a common bolt means about the periphery of said housing means.

4. An overload release coupling according to claim 3 wherein said houding means has attached thereto a chain wheel, said bolt means passing through said chain wheel to secure said chain wheel to said housing member whereby they will rotate together.

5. An overload release coupling according to claim 2 wherein said driven member includes four piston means arranged at the quarter points and wherein said inner surface has four recesses therein spaced at quarter points whereby all of said pistons may engage the recesses at the same time.

6. An overload release coupling according to claim 5 wherein said first portion of said piston has a rectangular tapered head configuration, said recess being of a mating configuration with parallel surfaces whereby when said head is seated in said recess planar contact is effected therebetween.

7. An overload release coupling comprising a rotatable housing means, a driven member journalled in said housing means, said driven member having at least portions thereof lying on a generally circular outer periphery, said driven member having radially extending cylinder means with a piston means therein, said housing means having an inner surface area radially spaced from said driven member outer periphery, a recess means in said inner surface of said housing means, said piston having a first portion and a second portion, a resilient means on said driven member bearing against said second portion to bias said piston outwardly of said outer periphery of said driven member, said piston first portion engaging said recess in said inner surface area whereby said driven member and said housing means are caused to rotate together under normal conditions but are disengaged when the forces between the driven member and the housing member overcome the biasing force of said resilient means, electric switch means mounted on said housing, and coupling means connected between said piston and said switch means for causing said switch means to produce an electric signal in response to disengagement of said driven member and said housing means.

8. Apparatus according to claim 7 including control means associated with said switch means and adapted to discontinue the drive of said driven member.

* * * * *